United States Patent
Shoji et al.

(10) Patent No.: US 12,485,549 B2
(45) Date of Patent: Dec. 2, 2025

(54) ROBOT SYSTEM AND ROBOT CONTROL METHOD

(71) Applicant: KAWASAKI JUKOGYO KABUSHIKI KAISHA, Kobe (JP)

(72) Inventors: Tadashi Shoji, Kobe (JP); Toshiyuki Suzuki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 171 days.

(21) Appl. No.: 18/272,306

(22) PCT Filed: Jan. 6, 2022

(86) PCT No.: PCT/JP2022/000290
§ 371 (c)(1),
(2) Date: Jul. 13, 2023

(87) PCT Pub. No.: WO2022/153923
PCT Pub. Date: Jul. 21, 2022

(65) Prior Publication Data
US 2024/0066713 A1    Feb. 29, 2024

(30) Foreign Application Priority Data
Jan. 15, 2021    (JP) .................................. 2021-004667

(51) Int. Cl.
*B25J 9/16*    (2006.01)
(52) U.S. Cl.
CPC .................................. *B25J 9/1697* (2013.01)
(58) Field of Classification Search
None
See application file for complete search history.

(56) References Cited

U.S. PATENT DOCUMENTS 5,040,056 A * 8/1991 Sager ..................... B25J 9/0093
                                                  901/8
9,052,710 B1 * 6/2015 Farwell ............... G05B 19/423
(Continued)

FOREIGN PATENT DOCUMENTS

EP    2960022 A1 * 12/2015    ............ B25J 9/1697
JP    H11156775 A *  6/1999
(Continued)

OTHER PUBLICATIONS

Mar. 22, 2022 Search Report issued in International Patent Application No. PCT/JP2022/000290.

*Primary Examiner* — Bao Long T Nguyen
*Assistant Examiner* — Dairon Estevez
(74) *Attorney, Agent, or Firm* — Oliff PLC

(57) ABSTRACT

A plurality of robots are installed so that they can simultaneously work on a common workpiece. Robot controllers are installed corresponding to the robots respectively. Each of vision sensors can acquire visual information about a measurement target that the workpiece has. The plurality of the robot controllers and the plurality of the vision sensors can all communicate with the visual processing computer commonly used. The visual processing computer computes a workpiece coordinate system based on a result of measurement of the measurement target that appears in the visual information acquired by the plurality of the vision sensors. Each of the robot controllers corrects a motion of the robot corresponding to the robot controller based on a result of a request to the visual processing computer.

6 Claims, 5 Drawing Sheets

(56) References Cited

U.S. PATENT DOCUMENTS

| | | | |
|---|---|---|---|
| 2006/0072809 A1 | 4/2006 | Hashimoto et al. | |
| 2010/0211190 A1 | 8/2010 | Akita | |
| 2013/0329954 A1* | 12/2013 | Ikeda | G06T 1/0007 |
| | | | 382/103 |
| 2016/0078583 A1* | 3/2016 | Nishitani | G06T 1/0014 |
| | | | 348/207.1 |
| 2019/0121335 A1* | 4/2019 | Yoneda | G05B 19/0405 |
| 2019/0210222 A1* | 7/2019 | Li | G05B 19/05 |
| 2022/0134567 A1* | 5/2022 | Ishikawa | B25J 9/1633 |
| | | | 700/254 |

FOREIGN PATENT DOCUMENTS

| | | | |
|---|---|---|---|
| JP | 2005074617 A * | 3/2005 |
| JP | 4137862 B2 | 8/2008 |
| JP | 2017-204955 A | 11/2017 |
| WO | 02/23297 A1 | 3/2002 |
| WO | 2009/063565 A1 | 5/2009 |

* cited by examiner

ROBOT SYSTEM AND ROBOT CONTROL METHOD

TECHNICAL FIELD

This disclosure relates to the use of a vision sensor for a robot.

BACKGROUND ART

When a robot is to perform a given operation, a program is created in advance, either through off-line teaching work or through simulation. The positional relationship between the robot and the workpiece and the like when the robot is off-line or simulated may not match the positional relationship when the robot is actually operated. In order to measure and correct this error, a system such as those disclosed in PTL 1, for example, has been proposed.

PTL 1 discloses a configuration, when there are multiple pairs each of which consists of one robot and one robot control device, that allows multiple robot control devices to share image data from one camera. For multiple robots (robot control devices), only one imager (camera) is used. The camera can be attached to the tip of the arm of each robot.

Each time the combination of the robot and object to be measured is changed, the camera is reattached. Specifically, the camera is first attached to the first robot, and the three-dimensional relative position regarding the combination consisting of the first robot and the object to be measured is measured. Next, the camera that was attached to the first robot is attached to the second robot, and the three-dimensional relative position regarding the combination consisting of the second robot and the object to be measured is measured.

The system of PTL 1 includes an image processing device. This image processing device performs image processing to extract, for example, three points from an image captured by the camera. PTL 1 also discloses an example where the image processing device is external to the robot control device and included in the network.

PRIOR-ART DOCUMENTS

Patent Documents

PTL 1: Japanese Patent No. 4137862

SUMMARY OF THE INVENTION

Problems to be Solved by the Invention

In the configuration of PTL 1, multiple robots deliver one camera from one to another while taking images of the object to be measured. Therefore, the cycle time for correction is long, and man-hours are required to program the robots to perform the delivery operation.

In PTL 1, three points are extracted from each of the images taken by the camera at each robot to measure the three-dimensional relative positions. Therefore, it is difficult to make positional corrections consistent among multiple robots.

The present disclosure is made in view of the above circumstances, and the purpose of the present disclosure is to provide a robot control system that can easily perform corrections that are consistent between multiple robots.

Means for Solving the Problems

The problem to be solved by this disclosure is as described above, and the means to solve this problem and their effects are described next.

According to a first aspect of the present disclosure, a robot system having the following configuration is provided. The robot system includes a plurality of robots, a plurality of robot controllers, a plurality of vision sensors, and a visual processing computer. The robots are installed so that they can simultaneously work on a workpiece. The robot controllers are installed corresponding to the robots respectively. The visual sensors are capable of acquiring visual information. The visual processing computer performs processing based on information acquired by the vision sensors. All of the vision sensors are capable of acquiring visual information of a measurement target that the workpiece has. The plurality of the robot controllers and the plurality of the vision sensors can all communicate with the visual processing computer commonly used. The visual processing computer computes a workpiece coordinate system based on a result of measurement of the measurement target that appears in the visual information acquired by the plurality of the vision sensors. Each of the robot controllers corrects a motion of the robot corresponding to the robot controller based on a result of a request to the visual processing computer.

According to a second aspect of the present disclosure, the following robot control method is provided. The robot control method is directed to a robot system including a plurality of robots, a plurality of robot controllers, a plurality of vision sensors, and a visual processing computer. The robots are installed so that they can simultaneously work on a workpiece. The robot controllers are installed corresponding to the robots respectively. The vision sensors are capable of acquiring visual information. The visual processing computer performs processing based on information acquired by the vision sensors. The robot control method includes a first process, a second process, and a third process. In the first process, each of the vision sensors acquires visual information of a measurement target that the workpiece has, and transmits the visual information to the visual processing computer commonly used. In the second process, the visual processing computer computes a workpiece coordinate system based on a result of measurement of the measurement target that appears in the visual information received from the plurality of the vision sensors. In the third process, each of the robot controllers transmits a request to the common visual processing computer and corrects a motion of the robot corresponding to the robot controller based on a response received from the visual processing computer.

This allows for a natural aggregation of information since the configuration consists of one or a few visual processing computers acquiring information from a plurality of visual sensors to compute the workpiece coordinate system. Therefore, it is suitable for coordinating information from multiple vision sensors and computing the workpiece coordinate system. Since this workpiece coordinate system is commonly used for motion correction of multiple robots, motion correction can be consistent between multiple robots. In addition, since a server device performs the processing in response to requests from multiple robot controllers in a centralized manner, it is easy to simplify the processing and communication.

Effects of the Invention

According to the present disclosure, it is easy to make corrections that are consistent between multiple robots.

EMBODIMENT FOR CARRYING OUT THE INVENTION

Figure 1:
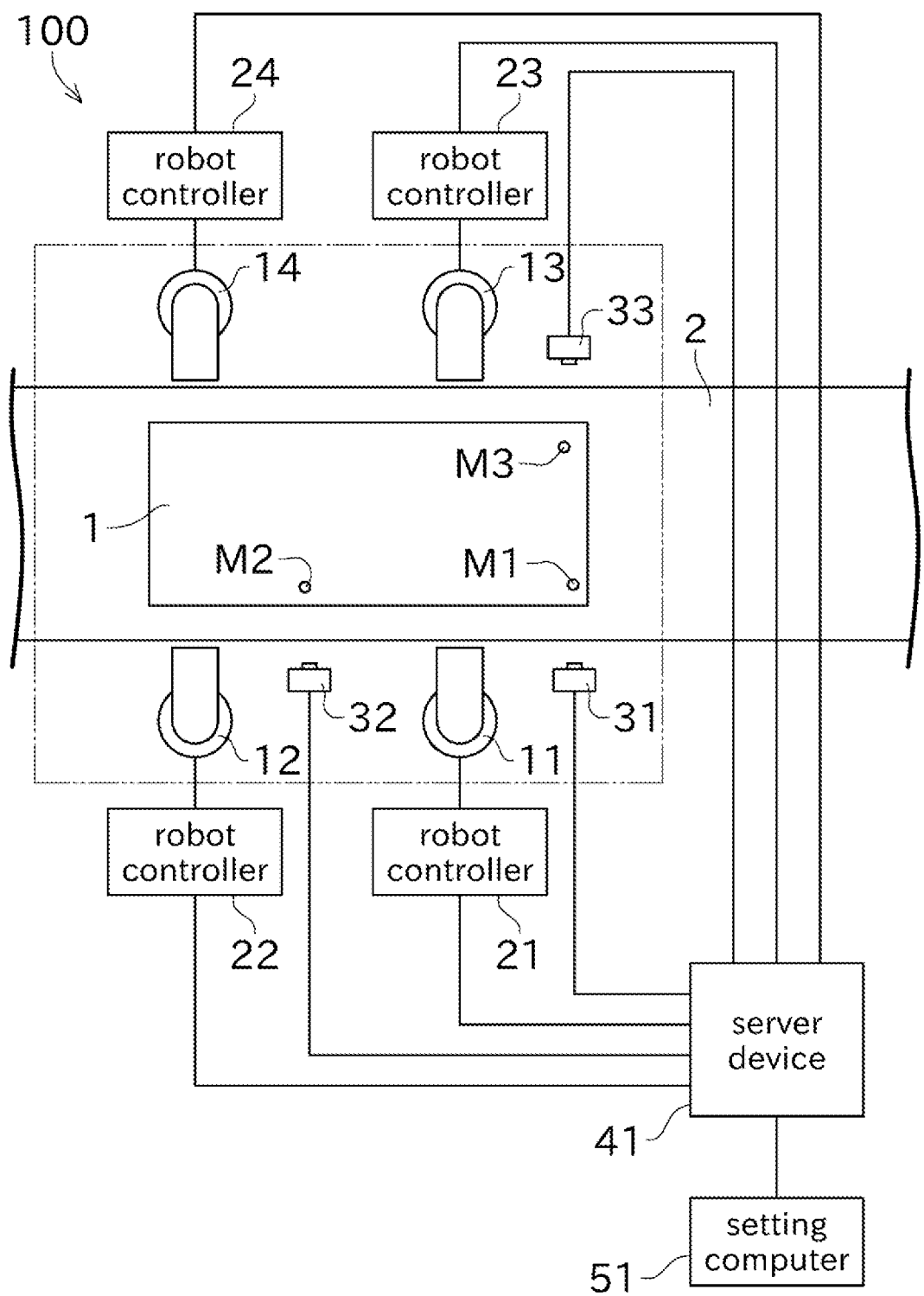
FIG. 1 is a schematic diagram showing an overall configuration of a robot system according to the first embodiment of the present disclosure.

Next, embodiments of the disclosure will be described with reference to the drawings. FIG. 1 is a schematic diagram showing an overall configuration of a robot system 100 according to the first embodiment of the disclosure.

The robot system 100 shown in FIG. 1 is a system that uses a plurality of robots 11, 12, 13, 14 to perform work with respect to a workpiece 1. The robot system 100 is installed, for example, on a manufacturing line in a factory.

The robot system 100 includes the robots 11, 12, 13, 14, robot controllers 21, 22, 23, 24, cameras (vision sensors) 31, 32, 33, and a server device (visual processing computer) 41.

The robot 11 is an industrial robot. The robot 11 is configured as a vertical articulated robot with 6 degrees of freedom of motion. However, the configuration of the robot is not limited to this.

The workpiece 1 that has been conveyed by the conveyor 2 rests at a predetermined position surrounded by the four robots 11, 12, 13, 14. The four robots 11, 12, 13, 14 can perform work on the workpiece 1 simultaneously. The work performed by the robots is arbitrary and may be, for example, assembly, welding, painting, etc. Instead of the conveyor 2, another device (for example, a feeder) capable of moving the workpiece 1 can be used.

The configuration of the four robots 11, 12, 13, 14 may be identical or different. The work performed by the four robots 11, 12, 13, 14 on the workpiece 1 may be identical or different. The number of robots simultaneously working on the workpiece 1 is not limited to four, but may be two, three, or five or more.

The four robot controllers 21, 22, 23, 24 are arranged corresponding to the four robots 11, 12, 13, 14. Each of the robot controllers 21, 22, 23, 24 is configured as a computer with a CPU, a ROM, a RAM, and the like.

The robot 11 is electrically connected to the robot controller 21. The robot 11 can operate based on commands from the robot controller 21 to perform a predetermined work on the workpiece 1. The robot 12 operates based on commands from the robot controller 22. The robot 13 operates based on commands from the robot controller 23. The robot 14 operates based on commands from the robot controller 24. Thus, one robot is controlled by one robot controller.

Each of the robot controllers 21, 22, 23, 24 is electrically connected to the server device 41. Each of the robot controllers 21, 22, 23, 24 can transmit and receive information by communication.

The cameras 31, 32, 33 are imaging devices capable of acquiring images (visual information). Each of the three cameras 31, 32, 33 is installed at an appropriate position capable of capturing an image of the workpiece 1 at the predetermined position described above. The number of cameras may be one, two, four or more. Some or all of the plurality of cameras may be composed of camera(s) that can be held by the robot instead of fixed camera(s). In this case, the robot operates so that the camera is at a predetermined capturing position before the capturing takes place.

The camera 31 is capable of capturing a mark M1 installed on the workpiece 1. The camera 32 can capture a mark M2 installed on the workpiece 1. The camera 33 can capture a mark M3 installed on the workpiece 1. The marks (measurement targets) M1, M2, M3 can be, for example, stickers attached to the workpiece 1. However, instead of the marks M1, M2, M3, the cameras 31, 32, 33 can also capture, for example, shape features (for example, convex, concave, or the like) as measurement targets that the workpiece 1 has.

Depending on the situation, the three marks M1, M2, M3 can be captured simultaneously by a single camera. However, depending on the size and shape of the workpiece 1 and the position of the marks M1, M2, M3, it may not be possible to put the three marks M1, M2, M3 in the field of view of a single camera. In the configuration of this embodiment, since the three marks M1, M2, M3 are captured by the three cameras 31, 32, 33 in a split manner, each of the marks M1, M2, M3 can be easily captured.

The camera 31 is located in the vicinity of the robot 11 and is associated with the robot controller 21. The camera 32 is located in the vicinity of the robot 12 and is associated with the robot controller 22. The camera 33 is located in the vicinity of the robot 13 and is associated with the robot controller 23. Thus, each of the cameras 31, 32, 33 belongs to any of the four robots 11, 12, 13, 14.

Each of the cameras 31, 32, 33 is electrically connected to the server device 41. Each of the cameras 31, 32, 33 can output the captured image to the server device 41 via communication.

The communication between the server device 41 and the robot controllers 21, 22, 23, 24, and between the server device 41 and the cameras 31, 32, 33 can be performed using a known LAN, for example. However, the communication method is not limited to LAN.

The server device 41 is configured as a computer including a CPU, a ROM, a RAM, and the like. It is preferable if the server device 41 is equipped with a CPU that has higher performance than the robot controller described above, or with special hardware such as a GPU, to enable high-speed image processing as described below.

The server device 41 performs known image processing (visual processing) on the image data acquired from the plurality of the cameras 31, 32, 33 to identify the position of each of the marks M1, M2, M3 in the three-dimensional space. This allows acquiring a three-dimensional Cartesian coordinate system that represents the actual position and posture of the workpiece 1. The coordinate system of the workpiece 1 means the coordinate system set with respect to the workpiece 1, which changes in conjunction with the movement/rotation of the workpiece 1. Hereafter, this coordinate system may be referred to as workpiece coordinate system.

In the server device 41, a three-dimensional Cartesian coordinate system that is immovable with respect to the ground (hereinafter referred to as common coordinate system), which is common for the robots 11, 12, 13, 14, is defined as appropriate. In this embodiment, one of the four robots 11, 12, 13, 14 chosen arbitrarily, is defined as a master robot. The common coordinate system may be, for example, a three-dimensional Cartesian coordinate system set for that master robot (master coordinate system). The coordinate system set for the robot is, for example, a coordinate system set with respect to an immovable foundation located at the base of the arm of the robot.

The workpiece coordinate system can be defined as a coordinate system whose origin is represented in the common coordinate system and the orientation of the three coordinate axes is represented in the common coordinate system. In this specification, the workpiece coordinate system may be referred to as frame.

The following is a specific description. For each of the three cameras 31, 32, 33, a camera coordinate system indicating its actual installation position and posture is defined. In the server device 41, for each camera, the camera coordinate system seen in the coordinate system specific to the robot to which the camera belongs is stored in advance. The coordinate system specific to each robot is described below. The server device 41 acquires the positions of the marks in the image captured by each camera in the form of two-dimensional Cartesian coordinates by using pattern recognition or other appropriate methods. Considering in three-dimensional space, the position of a mark in the image corresponds to the direction of the mark with respect to the camera that captured it. The relative positional relationships among the three marks M1, M2, M3 regarding the workpiece 1 are known. The server device 41 acquires the positions of the three marks M1, M2, M3 in the common coordinate system by solving a simultaneous equation generated based on the above information, after converting the direction of the marks relative to the camera to the common coordinate system (master coordinate system). By determining the positions of the three marks M1, M2, M3, the workpiece coordinate system can be uniquely identified.

In this embodiment, the cameras 31, 32, 33 are all configured as two-dimensional cameras. However, one or more of the camera(s) can be changed to three-dimensional camera(s). The configuration of the three-dimensional camera is arbitrary, but can be, for example, a camera of a stereo system, a ToF system, or the like. Based on the results of the capturing by the three-dimensional camera, the positions of marks M1, M2, M3 can be acquired in a three-dimensional manner. The position of the mark is represented by the three-dimensional coordinate system (camera coordinate system) specific to the three-dimensional camera that captured it. The server device 41 acquires the positions of the three marks M1, M2, M3 in the common coordinate system by solving a simultaneous equation after converting the positions of the marks captured by the three-dimensional camera from the camera coordinate system to the common coordinate system. In the case that a vision sensor capable of three-dimensional measurement is used in this way, instead of the marks M1, M2, M3, the three-dimensional shape features of the workpiece 1 can be as the measurement targets, by using known three-dimensional shape recognition.

The server device 41 responds to a request from the robot controllers 21, 22, 23, 24 with the acquired workpiece coordinate system. The robot controllers 21, 22, 23, 24 acquire the responded workpiece coordinate system as a coordinate system for correction. This allows the robots 11, 12, 13, 14 to recognize the actual position and posture of the workpiece 1 and correct their motions accordingly. As a result, they can flexibly cope with the misalignment of the position and posture of the workpiece 1.

The server device 41 responds the workpiece coordinate system acquired by computing while combining the imaging results by the three cameras 31, 32, 33, uniformly to any robot (robot controller). Thus, the corrections of the motions of the four robots 11, 12, 13, 14 are consistent with each other. In other words, disciplined corrections are possible with respect to the four robots 11, 12, 13, 14. Thus, it is suitable for working on one workpiece 1 simultaneously.

Of the four robots 11, 12, 13, 14, a specific coordinate system is defined for each of the robots other than the master robot as well as the master coordinate system. In the server device 41, for each of the robots, the coordinate system specific to the robot seen in the common coordinate system (master coordinate system) is stored in advance.

When the server device 41 responds the workpiece coordinate system for the robot other than the master robot, the workpiece coordinate system may be transformed to a form seen in a coordinate system specific to the robot (robot controller) that queried rather than the common coordinate system and the transformation result responded. The above coordinate transformation can be easily performed by using the information of the robot coordinate system. For example, assume that robot 13 is the master robot and that a vector Vms from the origin of the master coordinate system as the common coordinate system to the origin of the coordinate system specific to the robot 11 is known. If Vmes is a vector indicating the position of the workpiece 1 in the master coordinate system, a vector Vmes' indicating the position of this workpiece 1 in the coordinate system of the robot 11 can be expressed by the following equation.

$$Vmes'=-Vms+Vmes$$

If the coordinate transformation is performed on the robot controller side, this coordinate transformation is not required on the server device 41 side.

By the way, if the workpiece coordinate system is not acquired at the server device 41, it means that, on the robot side, no information on which the correction of its motion is based is available. Therefore, in this situation, it is not preferable for any of the four robots 11, 12, 13, 14 to work on the workpiece 1. In this regard, the configuration of this embodiment realizes interlock control by communication between the robot controllers 21, 22, 23, 24 and the server device 41, and the robots 11, 12, 13, 14 are made to wait until the workpiece coordinate system is acquired.

The server device 41 stores logs related to the operation and various settings. By operating the server device 41, the operator can view the logs, change the settings, or the like.

The server device 41 is configured to communicate with a setting computer 51. The communication can be performed using, for example, a known LAN or WAN. The setting computer 51 is physically located away from the server device 41. The setting computer 51 is configured as a known computer. By operating the setting computer 51 and accessing the server device 41, a remote operator can view the logs recorded on the server device 41 and change the settings related to the generation of the workpiece coordinate system.

Next, several interlock controls performed in the robot system 100 will be described.

First, an interlock control of the initialization process will be described with reference to FIG. 2. Since the processes performed by the four robot controllers 21, 22, 23, 24 are substantially the same, the processes performed by the robot controller 21 which is one of them will be described. The left side of FIG. 2 shows the processes performed by the robot controller 21, and the right side shows the processes performed by the server device 41.

Figure 2:
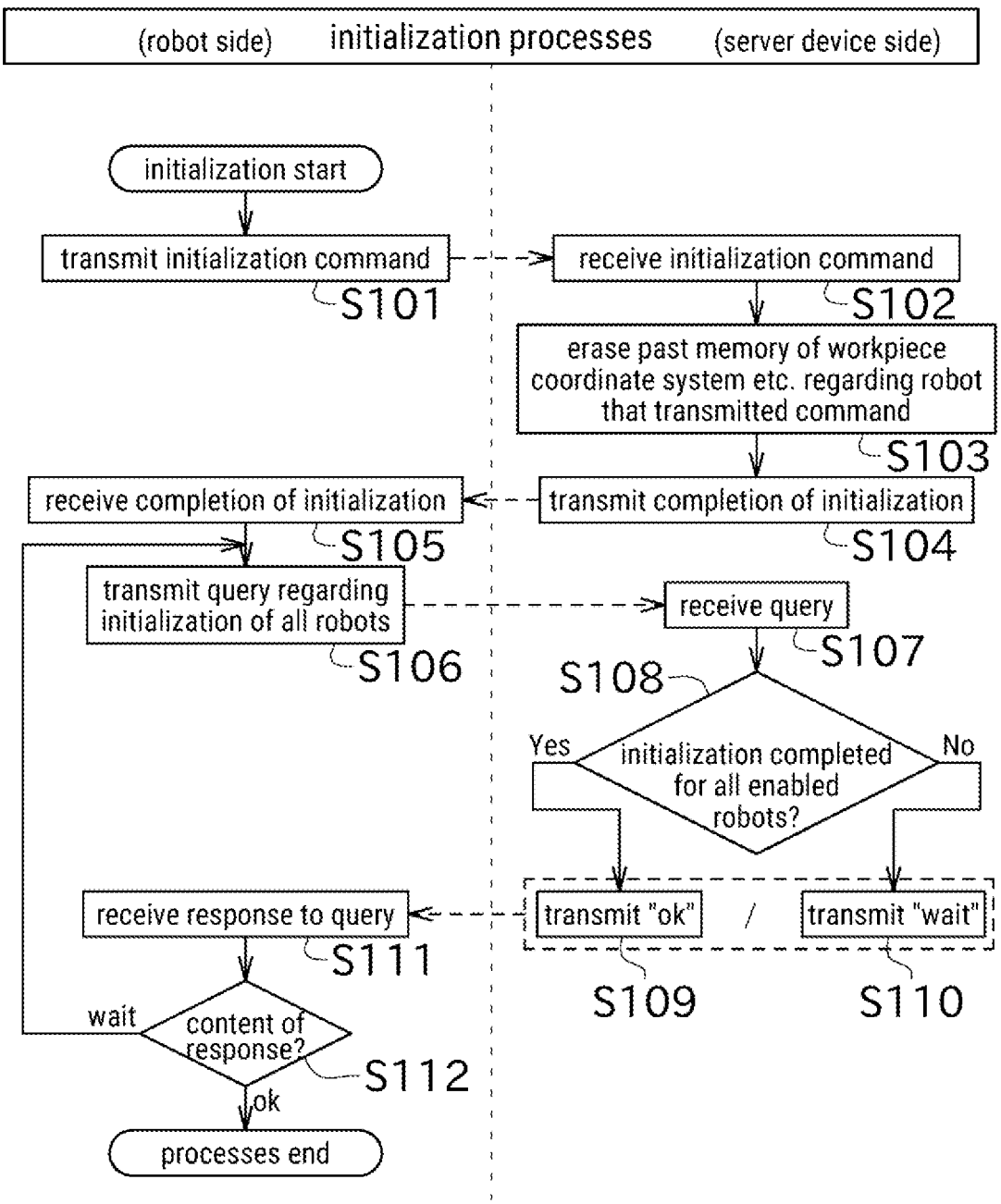
FIG. 2 is a flowchart illustrating an interlock control for initialization.

On the left side of FIG. 2, the processes performed by the robot controller 21 are shown. In the robot controller 21, these processes start by some trigger. On the right side of FIG. 2, the processes performed by the server device 41 are shown.

The robot controller 21 first transmits an initialization command to the server device 41 (step S101). When the server device 41 receives this command (step S102), the server device 41 erases past memory of the workpiece coordinate system conversion results, and the like (step S103) stored with respect to the robot controller 21 (substantially meaning the robot 11) which transmitted the command. When the initialization process is completed, the server device 41 transmits a message that the initialization is complete to the robot controller 21 which transmitted the command (step S104). The robot controller 21 receives the message that the initialization is complete from the server device 41 (step S105).

Although the processes of steps S101-S105 were described above while focusing on one robot controller 21, the same processes are performed with respect to the other robot controllers 22, 23, 24. Since the start timing of the processes shown in FIG. 2 in each of the four robot controllers 21, 22, 23, 24 is indefinite, the timing of transmitting the initialization command to the server device 41 is also indefinite. The server device 41 performs the initialization with respect to that robot at the timing when it receives the initialization command.

When the robot controller 21 receives the message from the server device 41 that the initialization is complete, it transmits a query to the server device 41 as to whether the initialization is complete with respect to all robots 11, 12, 13, 14 (step S106). The server device 41 receives this query from the robot controller 21 (step S107).

Upon receipt of the query, the server device 41 determines whether the initialization process of step S103 has been completed for all four robots 11, 12, 13, 14 (step S108). If the initialization has been completed for all robots, the server device 41 transmits "ok" as a response to the robot controller 21 that queried (step S109). If there are one or more robots for which the initialization has not been completed, the server device 41 transmits "wait" as a response (step S110). The word "wait" means that waiting is required. Therefore, the response "wait" can be considered as a kind of standby command from the server device 41 to the robot controller 21 that queried.

Depending on the circumstances, there may be a situation in which work is performed on the workpiece 1 by only three of the four robots, for example. The reason for such a fallback operation could be, but is not limited to, the occurrence of an abnormality in some of the robots. Once the setting is made to exclude some of the four robots from the interlock control, the server device 41 determines in step S108 whether the initialization has been completed for all of only the robots that are enabled.

When the robot controller 21 receives a response to the query from the server device 41 (step S111), it determines the content of the response (step S112). If the content of the response is "wait", the process returns to step S106 and the robot controller 21 again transmits the query to the server device 41. If the content of the response is "ok", the series of processes for the initialization ends. On condition that the processes shown in FIG. 2 are completed, the robot controller 21 can start the next processes.

Although the processes of steps S106-S112 were described above while focusing on one robot controller 21, the same processes are performed with respect to the other robot controllers 22, 23, 24. Whenever the query is received from any of the four robot controllers 21, 22, 23, 24, if any robot has not completed initialization in step S103, the server device 41 responds "wait". The processes shown on the left side of FIG. 2 do not end successfully unless the response from the server device 41 is "ok". Therefore, the processes shown in FIG. 2 are not completed in any of the robot controllers 21, 22, 23, 24 unless the initialization in the server device 41 is completed for all robots 11, 12, 13, 14. In this way, the interlock control with respect to the initialization process is realized.

Next, the measurement processes of the marks M1, M2, M3, which are a prerequisite for acquiring the workpiece coordinate system, will be explained with reference to FIG. 3. These processes are carried out in a manner that the three robot controllers 21, 22, 23 with which the cameras 31, 32, 33 are associated take part. Since the processes performed by the three robot controllers 21, 22, 23 are substantially the same, the processes performed by the robot controller 21 which is one of them, will be described. As stated above, instead of the marks M1, M2, M3, appropriate visual features of the workpiece 1 may be measured.

Figure 3:
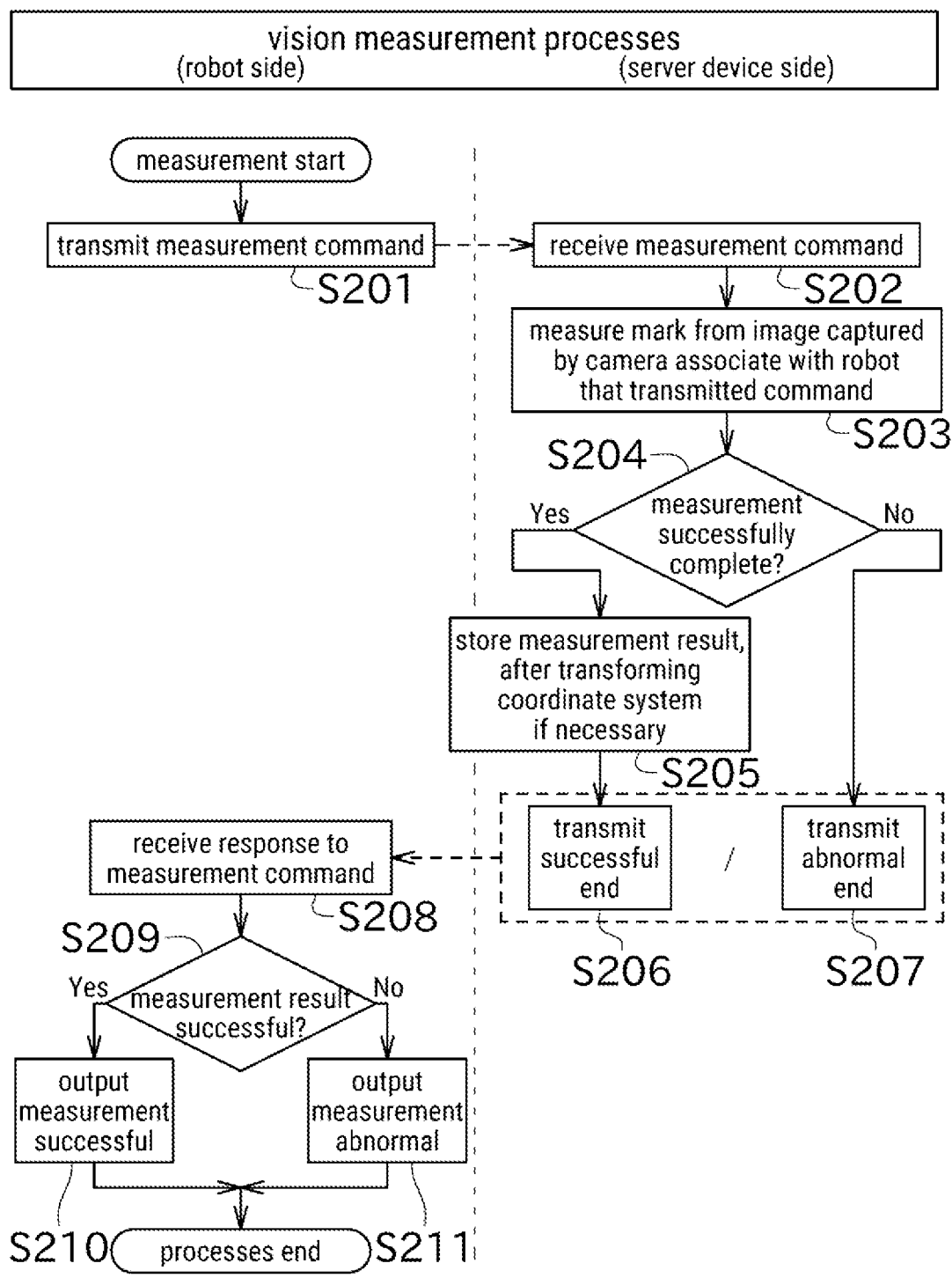
FIG. 3 is a flowchart illustrating processes of measuring a mark based on an image by a camera.

On the left side of FIG. 3, the processes performed by the robot controller 21 are shown. In the robot controller 21, these processes start when it is detected by a sensor or the like that the workpiece 1 has been transported to the predetermined position. On the right side of FIG. 3, the processes performed by the server device 41 are shown.

The robot controller 21 first transmits a measurement command to the server device 41 (step S201). The server device 41 receives this command (step S202). The server device 41 immediately transmits a capturing command to the camera 31 associated with the robot controller 21 (substantially, the robot 11) which transmitted the command, and acquires the position of the mark M1 by pattern recognition or the like from the captured image that is acquired (step S203). The position of the mark M1 here means the two-dimensional Cartesian coordinates in the image. The process of the camera 31 transmitting the image to the server device 41 in step S203 corresponds to a first process.

The server device 41 then determines whether the measurement of the position of the mark M1 has been successfully completed (step S204). If the measurement has been successfully completed, the server device 41 transforms the position of the mark M1 from the above two-dimensional Cartesian coordinate system to a three-dimensional Cartesian coordinate system specific to the robot 11, and further transforms it to the master coordinate system if the robot 11 is not the master robot, and stores it (step S205). The transformation between the master coordinate system and the coordinate systems of other robots will be described later. The server device 41 then transmits a message that the measurement has been successfully ended to the robot controller 21 which transmitted the command (step S206).

If the position of mark M1 could not be acquired due to a pattern recognition failure or the like, the server device 41 transmits a message to the robot controller 21 that the measurement has abnormally ended (step S207).

As described above, the camera 31 can be a three-dimensional camera. If the camera 31 is a three-dimensional camera, the coordinates of the mark M1 acquired by the server device 41 in step S203 are three-dimensional coordinates in the three-dimensional coordinate system specific to the camera 31 (camera coordinate system, vision sensor coordinate system). These three-dimensional coordinates are transformed to the three-dimensional Cartesian coordinate system specific to the robot 11 in step S205, and further transformed to the master coordinate system if necessary. The process that the camera 31 transmits, for example, data about three-dimensional points to the server device 41 in step S203 corresponds to the first process.

When the robot controller 21 receives a response to the measurement command from the server device 41 (step S208), it determines the measurement result included in the response (step S209). If the measurement result is successful, the robot controller 21 records in a log or the like that the position of mark M1 was measured successfully (step S210). If the measurement result is abnormal, the robot controller 21 records in a log or the like that an error has occurred (step S211). In either case, the series of processes ends.

Although the processes of steps S201-S211 were described above while focusing on one robot controller 21, the same processes are performed with respect to the other robot controllers 22, 23. As described above, the positions of the three marks M1, M2, M3 can be measured from the images captured by the three cameras 31, 32, 33, and the measurement results can be stored on the server device 41 side. The timing at which the respective robot controllers 21, 22, 23 transmit the measurement commands to the server device 41 can be arbitrary. The server device 41 measures the position of the mark, at the timing when the server device 41 receives the measurement command, from the image captured by the camera associated with the robot controller which transmitted the command.

Next, an interlock control for the generation of the workpiece coordinate system will be described with reference to FIG. 4. These processes are performed by the four robot controllers 21, 22, 23, 24. Since the processes performed by the four robot controllers 21, 22, 23, 24 are substantially the same, the processes performed the robot controller 21 which is one of them will be described. For simplicity of the description, the workpiece coordinate system is denoted as frame in FIG. 4.

Figure 4:
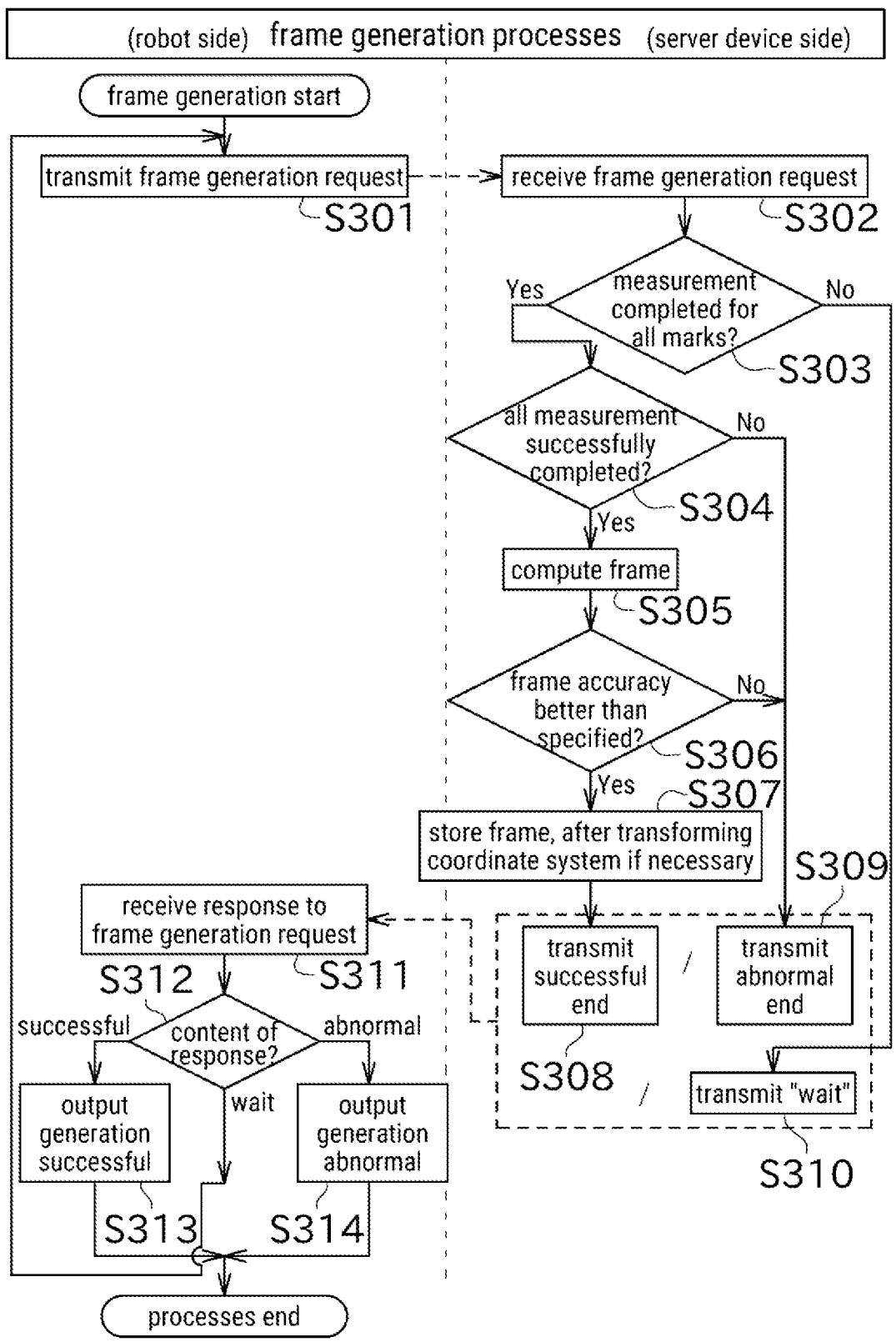
FIG. 4 is a flowchart illustrating an interlock control for acquiring a workpiece coordinate system.

On the left side of FIG. 4, the processes performed by the robot controller 21 are shown. In the robot controller 21, these processes start by some trigger. The trigger is, for example, but not limited to, the completion of the mark M1 measurement processes described in FIG. 3. On the right side of FIG. 4, the processes performed by the server device 41 are shown.

The robot controller 21 first transmits a request to the server device 41 to generate a workpiece coordinate system (step S301). The server device 41 receives this request from the robot controller 21 (step S302).

Upon receipt of the request, the server device 41 determines whether the measurement processes described in step S203 of FIG. 3 have been completed with respect to all three marks M1, M2, M3 (step S303). This determination, in other words, means a determination of whether the measurement processes have been completed with respect to all of the robot controllers 21, 22, 23, and with respect to all of the three cameras 31, 32, 33.

If all measurement processes have been completed, the server device 41 determines whether all measurement processes have been successfully completed (step S304).

If all measurement processes have been successfully completed, the server device 41 acquires the workpiece coordinate system by computation using the positions of marks M1, M2, M3 that were stored in step S205 (step S305, second process). The server device 41 then computes the accuracy of the generated workpiece coordinate system by calculation and determines whether this accuracy is equal to or greater than a specified level (step S306). This accuracy is the accuracy related to the identification of the position and posture of the workpiece 1. The determination can be made, for example, as follows. The server device 41 stores reference values in advance for each of the sides of the triangular shape with the three marks M1, M2, M3 as vertices. If the difference from the reference value is equal to or less than a predetermined value for all of three sides of the triangle, the server device 41 determines that the accuracy of the workpiece coordinate system is equal to or greater than the specified level. If one or more sides have a difference from the reference value that is greater than the predetermined value, the server device 41 determines that the accuracy of the workpiece coordinate system is less than the specified level. However, the method of determining whether the accuracy is good or bad is not limited to the above.

If it is determined that the accuracy is equal to or greater than the specified accuracy with respect to the workpiece coordinate system, the server device 41 stores the acquired workpiece coordinate system (step S307). Before the workpiece coordinate system is stored, it may be transformed, if necessary, so that it is seen in a coordinate system specific to the robot controller 21 (substantially, the robot 11) that queried.

The server device 41 then transmits a response to the robot controller 21 which transmitted the request, stating that the generation of the workpiece coordinate ended successfully (step S308). The content of this response includes information of the workpiece coordinate system that was acquired.

If it is determined in step S304 that even one of all measurement processes has ended abnormally, the server device 41 transmits a response to the robot controller 21 which transmitted the request, stating that the generation of the workpiece coordinate system ended abnormally (step S309). The same applies when the server device 41 determines that the frame with the predetermined accuracy cannot be acquired in the determination of step S306.

If, in the determination of step S303, the measurement processes have not yet been completed with respect to at least one of the three marks M1, M2, M3, the server device 41 transmits "wait" as a response to the robot controller 21 which transmitted the request (step S310).

When the robot controller 21 receives the response to the request from the server device 41 (step S311), it determines the content of the response (step S312). If the response indicates a successful end, the robot controller 21 records in a log or the like that the workpiece coordinate system was generated successfully (step S313). If the response indicates an abnormal end, the robot controller 21 records in the log or the like that an error occurred and the workpiece coordinate system could not be generated (Step S314). Regardless of whether the response indicates the successful end or the abnormal end, the series of processes shown in FIG. 4 ends. If the response is "wait", the process returns to step S301 and the robot controller 21 again transmits the request for generation of the workpiece coordinate system to the server device 41.

When the robot controller 21 transmitted the request for generation of the workpiece coordinate system in step S301 in FIG. 3 and the response acquired in step S311 indicates successful end, the robot controller 21 then corrects the motion of the robot 11 to conform to the actual position and posture of the workpiece 1 based on the acquired workpiece coordinate system. This series of processes corresponds to a third process in the robot control method.

Although the processes of steps S301-S314 were described above while focusing on one robot controller 21, the same processes are performed with respect to the other robot controllers 22, 23, 24. Whenever the request to generate the workpiece coordinate system is received from any of the four robot controllers 21, 22, 23, 24, if the conditions for generating the workpiece coordinate system are not met at the time of the request, the server device 41 responds "wait". The processes shown on the left side of FIG. 4 do not end successfully unless the response from the server device 41 indicates a successful end. Therefore, the processes shown in FIG. 4 are not completed in any of the robot controllers 21, 22, 23, 24 unless the conditions for generation of the workpiece coordinate system are met in the server device 41. In this way, the interlock control with respect to the workpiece coordinate system is realized.

In this embodiment, the server device 41 acquires image data from the three cameras 31, 32, 33 and measures the marks M1, M2, M3. Therefore, image processing is not required on the robot controllers 21, 22, 23, 24 side, and thus an inexpensive configuration can be adopted. Even if a high-performance CPU is used in the server device 41, for example, to perform image processing in a short time, the increase in cost is limited because there is only one server device 41.

In the robot system 100 of this embodiment, the server device 41 that performs image processing as described above also computes the workpiece coordinate system in response to the requests from multiple robot controllers 21, 22, 23, 24 to generate the workpiece coordinate system. If the conditions that make the workpiece coordinate system computable are not met, the server device 41 responds "wait" to the request for generation of the workpiece coordinate system, thereby achieving interlocking.

Next, the range of robots to which the workpiece coordinate system computed by server device 41 applies will be described.

In this embodiment, the workpiece coordinate system is shared by the four robots 11, 12, 13, 14 that simultaneously perform one work process on the workpiece 1. In other words, it can be considered that one group is formed by the four robots 11, 12, 13, 14, and one workpiece coordinate system is computed and used in common with respect to this group.

However, the server device 41 may, for example, compute the workpiece coordinate system with respect to the two robots 11, 12 located on the right side in respect of the conveyor 2 and the workpiece coordinate system with respect to the two robots 13, 14 located on the left side. In this case, it can be considered that one group is formed by the two robots on the left and right sides of the conveyor 2, respectively, and the workpiece coordinate system is computed for each group. The interlock control of the initialization and interlock control of the workpiece coordinate system described above can be performed with the group as a unit.

As described above, the robot system 100 of this embodiment includes the four robots 11, 12, 13, 14, the four robot controllers 21, 22, 23, 24, the three cameras 31, 32, 33, and the server device 41. The four robots 11, 12, 13, 14 are installed so that they can work simultaneously on the same workpiece 1. The robot controllers 21, 22, 23, 24 are installed corresponding to the robots 11, 12, 13, 14 respectively. The cameras 31, 32, 33 are capable of acquiring images. The server device 41 performs processing based on the information acquired by the cameras 31, 32, 33. The camera 31 can acquire the image for the mark M1 that workpiece 1 has. Similarly, the camera 32 can acquire the image for the mark M2, and the camera 33 can acquire the image for the mark M3. The four robot controllers 21, 22, 23, 24 and the three cameras 31, 32, 33 can all communicate with the common server device 41. The server device 41 computes the workpiece coordinate system based on the measurement of the marks M1, M2, M3 that appear in the images acquired by the three cameras 31, 32, 33. Each of the robot controllers 21, 22, 23, 24 corrects the motion of the robot 11, 12, 13, 14 corresponding to the robot controller based on the result of the request to the server device 41.

This allows the server device 41 and the robot controllers 21, 22, 23, 24 to clearly separate the processing targets. Since image processing is not required on the robot controller 21, 22, 23, 24 side, low-cost hardware can be applied. Since there is only one server device 41 on the image processing side, the increase in cost is limited even if, for example, special hardware with enhanced image processing capability is applied. Since one server device 41 is configured to acquire information from multiple cameras 31, 32, 33 and compute the workpiece coordinate system, information aggregation can be achieved naturally. Therefore, it is suitable for computing the workpiece coordinate system by coordinating information from multiple cameras 31, 32, 33. In addition, since the server device 41 performs the processing in response to requests from multiple robot controllers 21, 22, 23, 24 in a centralized manner, it is easy to simplify the processing and communication.

In the robot system 100 of this embodiment, when the server device 41 receives a request from, for example, the robot controller 21, in a state that the measurement of the target has not been completed with respect to one or more of the cameras 31, 32, 33, the server device 41 transmits as a response to the request "wait" to the robot controller 21 that requested. The robot controller 21 makes another request to the server device 41 upon receipt of "wait".

This allows interlock control, in which the robots 11, 12, 13, 14 are not operated unless the workpiece coordinate system is acquired, to be reasonably realized in a manner in which the server device 41 computing the workpiece coordinate system serves as a contact point for the request.

In the robot system 100 of this embodiment, the server device 41 stores information about the workpiece coordinate system with respect to each of the robots 11, 12, 13, 14. The server device 41 initializes, according to an initialization command transmitted by, for example, the robot controller 21, the information with respect to the robot 11 corresponding to the robot controller 21 that transmits the initialization command. Each of the robot controllers of the robots belonging to a group including a plurality of the robots 11, 12, 13, 14 to which the workpiece coordinate system is applied (for example, the robot controller 21), transmits the query to the server device 41 as to whether the initialization of the information concerning the workpiece coordinate system has been completed for all four robots 11, 12, 13, 14 belonging to the above group. If the server device 41 receives the query from the robot controller corresponding to the robot belonging to the group (for example, the robot controller 21), in a state with the initialization of the information on the workpiece coordinate system has not been completed with respect to one or more of the robots belonging to the group, the server device transmits as a response to the query "wait" to the robot controller 21 that queried. The robot controller 21 makes another query to the server device 41 upon receipt of "wait".

This allows interlock control by the server device 41 in which transition to the next process is prohibited unless the information regarding all robots has been initialized.

In the robot system 100 of this embodiment, the server device 41 can communicate with the setting computer 51. The server device 41 can modify settings related to the acquisition of the workpiece coordinate system according to the transmission from the setting computer 51. Various settings related to the acquisition of the workpiece coordinate system are conceivable, and may include settings related to pattern recognition of marks M1, M2, M3, for example.

This makes it possible to remotely change the settings for the server device 41. Thus, convenience is improved because the operator does not need to travel to the location where the server device 41 is installed.

Figure 5:
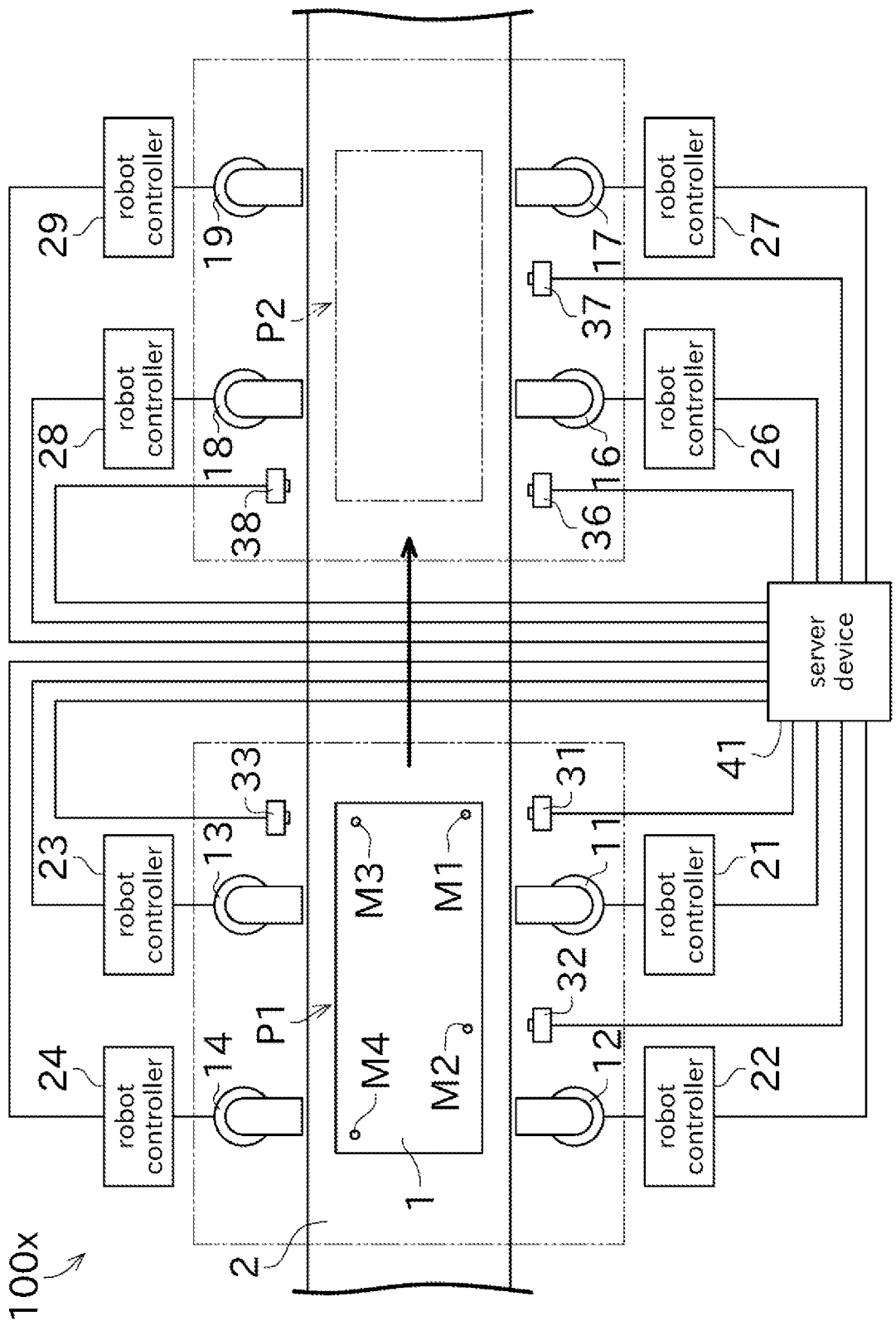
FIG. 5 is a schematic diagram of a robot system according to the second embodiment.

Next, the second embodiment will be described. FIG. 5 is a schematic diagram of 100$x$ for the second embodiment. In a description of this embodiment, members identical or similar to those of the above-described embodiment are given the same corresponding reference numerals on the drawings, and descriptions thereof may be omitted.

In a factory to which this robot system 100$x$ is applied, work is performed on the workpiece 1 over a plurality of work processes, as shown in FIG. 5. The server device 41 can compute the workpiece coordinate system for each work process.

After the workpiece 1 is transported by the conveyor 2 to a first position P1, a first work process is performed by four first robots 11, 12, 13, 14. The workpiece 1 is then transported by the conveyor 2 to a second position P2, a second work process is performed by four second robots 16, 17, 18, 19.

Four robot controllers 21, 22, 23, 24 are installed corresponding to the first robots 11, 12, 13, 14. Four robot controllers 26, 27, 28, 29 are installed corresponding to the second robots 16, 17, 18, 19.

Four marks M1, M2, M3, M4 are installed on the workpiece 1. First cameras (first vision sensors) 31, 32, 33 are installed in the vicinity of the first position P1 to capture the corresponding marks M1, M2, M3. Second cameras (second vision sensors) 36, 37, 38 are installed in the vicinity of the second position P2 to capture the corresponding marks M1, M2, M4.

The robot controllers 21, 22, 23, 24 of the first robots 11, 12, 13, 14 and the robot controllers 26, 27, 28, 29 of the second robots 16, 17, 18, 19 can all communicate with the server device 41. The first cameras 31, 32, 33 and the second cameras 36, 37, 38 can all communicate with the server device 41.

The four first robots 11, 12, 13, 14 in charge of the first work process can be considered to form one group. The server device 41 computes the workpiece coordinate system applied to this group. For this computation, the images captured by the first cameras 31, 32, 33 of the marks M1, M2, M3 respectively when the workpiece 1 is at the first position P1 are used.

The four second robots 16, 17, 18, 19 in charge of the second work process can be considered to form one group. The server device 41 computes the workpiece coordinate system applied to this group. For this computation, the images captured by the second cameras 36, 37, 38 of the marks M2, M1, M4 respectively when the workpiece 1 is at the second position P2 are used.

In this embodiment, the interlock control described in the first embodiment above is also performed. Here, this interlock control is performed with each group of work processes explained above as a unit. Therefore, it is possible to avoid the interlock control in one work process affecting another work process.

Although suitable embodiments of the present disclosure have been described above, the above configuration can be modified as follows, for example.

In the above embodiment, the server device 41 computes the workpiece coordinate system in response to the request from the robot controller 21. Not limited to this, the server device 41 can be configured to automatically start computing the workpiece coordinate system when the server device 41 receives the necessary image data from the cameras 31, 32, 33.

As a vision sensor, a stereo camera may be used instead of a camera, or a three-dimensional vision sensor such as a 3D laser sensor may be used.

A single camera may capture two or more marks simultaneously. In this case, the two or more marks appearing in one image are measured by the server device 41. Thus, for example, the positions of three marks M1, M2, M3 may be measured by two cameras. Thus, the number of cameras in each work process is arbitrary.

The workpiece coordinate system may be acquired from the positions of four or more marks instead of three.

Two or more computers may be used as the server device 41. In this case, the processing of visual information may be performed in a divided manner.

The functionality of the disclosed elements including the robot controllers 21, 22, 23, 24 and the server device 41 in this disclosure may be implemented using circuitry or processing circuitry which includes general purpose processors, special purpose processors, integrated circuits, ASICs (Application Specific Integrated Circuits), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A robot system comprising:
   a plurality of robots installed so as to work simultaneously on a common workpiece;
   robot controllers installed corresponding to the robots respectively;
   a plurality of vision sensors configured to acquire visual information; and
   a visual processing computer configured to perform processing based on information acquired by the vision sensors, wherein
   all of the vision sensors are configured to acquire the visual information of a measurement target of the workpiece,
   the plurality of the robot controllers and the plurality of the vision sensors are all configured to communicate with the visual processing computer commonly used,
   the visual processing computer is configured to compute a workpiece coordinate system based on a result of measurement of the measurement target that appears in the visual information acquired by the plurality of the vision sensors, each of the robot controllers corrects a motion of the robot corresponding to the robot controller based on a result of a request transmitted to the visual processing computer by each of the robot controllers, the visual processing computer stores information about the workpiece coordinate system with respect to each of the robots, the visual processing computer, according to an initialization command transmitted by each robot controller, performs an initialization process on the information with respect to the robot corresponding to each robot controller that transmits the initialization command, each of the robot controllers of the robots belonging to a group including two or more of the plurality of the robots to which the workpiece coordinate system is applied, transmits a query to the visual processing computer as to whether the initialization process of the information concerning the workpiece coordinate system has been completed for all the robots belonging to the group, if the visual processing computer receives each query in a state that the initialization process of the information on the workpiece coordinate system has not been completed regarding one or more of the robots belonging to the group, the visual processing computer transmits as a response to the query a standby command to each robot controller that queried, and each of the robot controllers makes another query to the visual processing computer upon receipt of the standby command.

2. The robot system according to claim 1, wherein
when the visual processing computer receives each request from each robot controller in a state that the measurement of the measurement target has not been completed with respect to one or more of the vision sensors, the visual processing computer transmits as a response to each request the standby command to the each robot controller that requested, and each of the robot controllers makes another request to the visual processing computer upon receipt of the standby command.

3. The robot system according to claim 1, wherein
the plurality of the robots include a plurality of first robots installed so as to work simultaneously on the workpiece that positions at a first position;

a plurality of second robots are installed so as to work simultaneously on the workpiece conveyed from the first position to a second position after working by the first robots, the plurality of the vision sensors include a plurality of first vision sensors and a plurality of second vision sensors, the robot controllers of the first robots, the robot controllers of the second robots, the first vision sensors, and the second vision sensors are in communication with the same visual processing computer, the visual processing computer computes a workpiece coordinate system at the first position based on a result of measurement of the measurement target that appears in the visual information acquired by the plurality of the first vision sensors, and computes a workpiece coordinate system at the second position based on a result of measurement of the measurement target that appears in the visual information acquired by the plurality of the second vision sensors, the robot controller of each of the first robots corrects a motion of the first robot corresponding to the robot controller based on a result of a request to the visual processing computer, and the robot controller of each of the second robots corrects a motion of the second robot corresponding to the robot controller based on a result of a request to the visual processing computer.

4. The robot system according to claim 3, wherein
when the visual processing computer receives the request from the robot controller of each first robot in a state that the measurement of the measurement target has not been completed with respect to one or more of the first vision sensors, the visual processing computer transmits as a response to the request the standby command to each robot controller that requested, the robot controller of each of the first robots makes another request to the visual processing computer upon receipt of the standby command, when the visual processing computer receives the request from the robot controller of each second robot in a state that the measurement of the measurement target has not been completed with respect to one or more of the second vision sensors, the visual processing computer transmits as a response to the request the standby command to each robot controller that requested, and the robot controller of each of the second robots makes another request to the visual processing computer upon receipt of the standby command.

5. The robot system according to claim 1, wherein
the visual processing computer is configured to communicate with a setting computer, and the visual processing computer is configured to modify a setting related to computation of the workpiece coordinate system according to transmission from the setting computer.

6. A robot control method for a robot system comprising:
a plurality of robots installed so as to work simultaneously on a common workpiece;

robot controllers installed corresponding to the robots respectively;

a plurality of vision sensors configured to acquire visual information; and a visual processing computer configured to performthat performs processing based on information acquired by the vision sensors, wherein the robot control method comprises:
a first process wherein each of the vision sensors acquires visual information of a measurement target of the workpiece, and transmits the visual information to the visual processing computer commonly used;

a second process wherein the visual processing computer computes a workpiece coordinate system based on a result of measurement of the measurement target that appears in the visual information received from the plurality of the vision sensors; and a third process wherein each of the robot controllers transmits a request to the common visual processing computer and corrects a motion of the robot corresponding to each robot controller based on a response received from the visual processing computer, wherein the visual processing computer stores information about the workpiece coordinate system with respect to each of the robots, the visual processing computer, according to an initialization command transmitted by each robot controller, performs an initialization process on the information with respect to the robot corresponding to each robot controller that transmits the initialization command, each of the robot controllers of the robots belonging to a group including two or more of the plurality of the robots to which the workpiece coordinate system is applied, transmits a query to the visual processing computer as to whether the initialization process of the information concerning the workpiece coordinate system has been completed for all the robots belonging to the group, if the visual processing computer receives each query in a state that the initialization process of the information on the workpiece coordinate system has not been completed regarding one or more of the robots belonging to the group, the visual processing computer transmits as a response to the query a standby command to each robot controller that queried, and each of the robot controllers makes another query to the visual processing computer upon receipt of the standby command.

\* \* \* \* \*